(12) United States Patent
Shimizu et al.

(10) Patent No.: US 8,814,690 B2
(45) Date of Patent: Aug. 26, 2014

(54) GAME MACHINE HAVING DATA MANAGEMENT ABILITY

(75) Inventors: Yusuke Shimizu, Tokyo (JP); Hiroshi Masui, Tokyo (JP); Toru Ikebuchi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 356 days.

(21) Appl. No.: 10/517,443

(22) PCT Filed: Jun. 11, 2003

(86) PCT No.: PCT/JP03/07429
§ 371 (c)(1),
(2), (4) Date: Dec. 9, 2004

(87) PCT Pub. No.: WO03/103788
PCT Pub. Date: Dec. 18, 2003

(65) Prior Publication Data
US 2005/0209008 A1    Sep. 22, 2005

(30) Foreign Application Priority Data

Jun. 11, 2002   (JP) ................................ 2002-169380

(51) Int. Cl.
*A63F 13/00* (2014.01)

(52) U.S. Cl.
USPC .......................................................... 463/42

(58) Field of Classification Search
CPC ........... A63F 2300/40; A63F 2300/403; A63F 2300/404; A63F 2300/406; A63F 2300/408; A63F 2300/50; A63F 2300/51; A63F 2300/53; A63F 2300/531; A63F 2300/55; A63F 2300/5546; A63F 2300/61; A63F 2300/63

USPC ..................................... 463/43, 29, 42, 40, 41
See application file for complete search history.

(56) References Cited

U.S. PATENT DOCUMENTS

| 4,339,798 A | * | 7/1982 | Hedges et al. .................. 463/26 |
| 4,467,424 A | * | 8/1984 | Hedges et al. .................. 463/26 |
| 5,491,326 A | * | 2/1996 | Marceau et al. ............... 235/381 |

(Continued)

FOREIGN PATENT DOCUMENTS

| JP | 6-106884 | | 4/1994 |
| JP | 2001-009157 | * | 7/1996 |

(Continued)

OTHER PUBLICATIONS

Excerpt English translation of Korean Patent Publication No. 2002-0005115, published Jan. 17, 2002 (Abstract & Claims).

(Continued)

*Primary Examiner* — Arthur O Hall
*Assistant Examiner* — Jeffrey Wong
(74) *Attorney, Agent, or Firm* — Finnegan, Henderson, Farabow, Garrett & Dunner, L.L.P.

(57) ABSTRACT

A game machine (10) includes a card interface (11) configured so that a magnetic card (20) is detachably attached thereto, an element (12) to record a card ID generated on the basis of time information specifying the date and time when the magnetic card (20) is attached to the card interface (11) in a magnetic data recording area (22) provided in the magnetic card (20), and an element (14) to print an access code uniquely obtained by the calculation of a predetermined function based on the card ID in a printing area (21) of the magnetic card (20).

16 Claims, 2 Drawing Sheets

(56) References Cited

U.S. PATENT DOCUMENTS

| | | | |
|---|---|---|---|
| 5,956,697 A * | 9/1999 | Usui | 705/32 |
| 6,116,402 A * | 9/2000 | Beach et al. | 194/216 |
| 6,280,328 B1 * | 8/2001 | Holch et al. | 463/42 |
| 6,652,380 B1 * | 11/2003 | Luciano | 463/25 |
| 6,679,775 B1 * | 1/2004 | Luciano et al. | 463/25 |
| 6,702,676 B1 * | 3/2004 | Ota et al. | 463/41 |
| 6,896,618 B2 * | 5/2005 | Benoy et al. | 463/25 |
| 6,916,246 B1 * | 7/2005 | Luciano, Jr. | 463/29 |
| 6,935,953 B2 * | 8/2005 | Marcu | 463/29 |
| 7,455,590 B2 * | 11/2008 | Hansen et al. | 463/40 |
| 2002/0111205 A1 * | 8/2002 | Beavers | 463/12 |
| 2002/0165024 A1 * | 11/2002 | Puskala | 463/40 |
| 2003/0078102 A1 * | 4/2003 | Okita et al. | 463/42 |
| 2008/0171601 A1 * | 7/2008 | Kirmse et al. | 463/42 |

FOREIGN PATENT DOCUMENTS

| | | | |
|---|---|---|---|
| JP | 8-299580 | | 11/1996 |
| JP | 09-179925 | | 7/1997 |
| JP | 10-033798 | | 2/1998 |
| JP | 10-207959 | | 8/1998 |
| JP | 10-283161 A | | 10/1998 |
| JP | 10-314440 | | 12/1998 |
| JP | 10-033821 | * | 6/1999 |
| JP | 11-164962 | | 6/1999 |
| JP | 2001-070651 | * | 9/1999 |
| JP | 2000-76118 | | 3/2000 |
| JP | 2000-187794 | | 7/2000 |
| JP | 2001-70651 | | 3/2001 |
| JP | 2001-104620 | | 4/2001 |
| JP | 2001-117820 | | 4/2001 |
| JP | 2001-224865 | | 8/2001 |
| JP | 2001-243126 | | 9/2001 |
| JP | 2002-922 | | 1/2002 |
| JP | 2002-000947 A | | 1/2002 |
| JP | 2002-157204 A | | 5/2002 |
| JP | 2002-163463 | | 6/2002 |
| JP | 2003-157237 | | 5/2003 |
| KR | 2002-0005115 | | 1/2002 |

OTHER PUBLICATIONS

Notice of Reasons for Rejection, dated Dec. 15, 2009, from the Japanese Patent Office in Japanese Patent Application No. 2008-114745, including partial English-language translation (14 pages).
Notice of Reasons for Rejection, dated Dec. 15, 2009, from the Japanese Patent Office in Japanese Patent Application No. 2007-156361, including partial English-language translation (10 pages).
Computer-generated English Translation of JP 2001-70651, 2001.
Computer-generated English Translation of JP 2001-224865, 2001.
Notice of Reasons for Refusal from the Japanese Patent Office, mailed Jul. 3, 2006 in Japanese Patent Application No. JP 2002-169380.
English Translation of JP 2002-922, 2002.
English Translation of JP 11-164962, 1999.
English Translation of JP 6-106884, 1994.
English Translation of JP 10-314440, 1998.
English Translation of JP 10-207959, 1998.
English Translation of JP 2001-117820, 2001.
English Translation of JP 2000-76118, 2000.
English Translation of JP 2002-163463, 2002.
English Translation of JP 2001-243126, 2001.
English Translation of JP 2001-104620, 2001.
English Translation of JP 8-299580, 1996.
Notice of Reasons for Refusal from the Japanese Patent Office, mailed Nov. 27, 2006 in Japanese Patent Application No. JP 2004-510906.
Partial English Translation of Notice of Reasons for Refusal, 2006.
Izumi Hashimoto, "Primary Internet Guide We Cannot Ask Anymore—Common Knowledge about IE & OE No. 21," *PC Fan*, vol. 9, 9th Issue, Total No. 177, Mainichi Communications Inc., Apr. 1, 2002, pp. 122-123.
Partial English Translation of "Primary Internet Guide We Cannot Ask Anymore—Common Knowledge about IE & OE No. 21.", 2003.
English Translation of JP 2002-000947 A, 2002.
English Translation of JP 2002-157204 A, 2002.
English Translation of JP 10-283161 A, 1998.

* cited by examiner

GAME MACHINE HAVING DATA MANAGEMENT ABILITY

TECHNICAL FIELD

The present invention relates to a data management technique for enabling a network game to be played by the use of a card.

BACKGROUND

Conventionally, it is common practice for a coin-operated game machine installed at play facilities such as video game arcades to record a player's game result on an external memory medium such as an IC card or magnetic card in preparation for the player's next game. The player is thus allowed to use the information recorded on the external memory medium to proceed with the game while reflecting the previous game result and hence to enjoy the game's development in a continuous manner. Additionally, a card ID (unique card number) is prerecorded electromagnetically as identification information on an external memory medium when the external memory medium is manufactured, whereby a game machine controller is enabled to identify the player. Also, the card ID is preprinted at a prescribed part of the card so that the player can identify the card visually. The player is thus able to use the card ID for performing various settings and registration for a game the player plays.

However, when card IDs are prerecorded before shipping external memory media, it not only requires some cost to record the card IDs but also requires proper management to prevent duplication of the cards. On the other hand, when external memory media are shipped without card IDs prerecorded, it is required to ensure the uniqueness of the card IDs.

Further, when a server device manages information over a network using card IDs, it is required not to stop the issuance of cards to ensure the uniqueness of card IDs even if the network temporarily malfunctions or even if the power to a game machine itself is temporarily shut off.

Further, card IDs recorded on magnetic cards can be utilized for user authentication when various services related to a game (such as an E-mail delivery service to offer a game walk-through) are provided for the purpose of attracting more players. In this case, however, each card ID tends to have many digits and hence it becomes very troublesome to input all of the digits of a card ID using a cellular phone or the like.

Conventionally, a game program installed in a game machine in a video game arcade can be played by anyone, and no special care has been taken to restrict players allowed to play a specific game program. Also, for increasing the occupancy rate and the customer attracting ability of the video game arcade, it is required to establish an environment where as many players can play games for as long as possible.

SUMMARY

Therefore, an object of the present invention is to propose a data management technique that is good at managing ID data. Another object of the present invention is to propose a technique for enhancing the customer attracting ability of play facilities such as video game arcades.

To achieve the objects, a game machine according to the present invention comprises: an external interface configured such that an external memory medium is detachably attached thereto; means for generating an ID for an external memory medium attached to the external interface by using a predetermined algorithm; ID recording means for recording the generated ID in a magnetic data recording area provided in the external memory medium; means for generating identification information corresponding to the ID and visually identifiable to a game player; and printing means for printing the identification information in a printing area of the external memory medium.

Preferably, the ID is identification information generated on the basis of time information and unique information to the game machine.

Preferably, the game machine obtains time information from a server device connected thereto via a network.

A game machine according to the present invention comprises: memory means for storing a plurality of game programs; and game processing means for reading a specific game program that is selected on the condition of satisfying a prescribed requirement from among the programs stored in the memory means, and executing the game program.

Preferably, the prescribed requirement is to achieve a certain result in a game.

A server device according to the present invention comprises: data management means for storing a character message entered from a terminal device to perform a data management task on a database; and communication means for transmitting the character message to the game machine operated by a player to display the same on image display means of the game machine.

A server device according to the present invention comprises: a plurality of game machines and a server device connected to the game machines via a network, and wherein the game machine comprises: an external interface configured such that an external memory medium is detachably attached thereto; recording means for generating an ID without duplication upon use of the external memory medium and recording the ID in a magnetic data recording area provided in the external memory medium, via the external interface; recording means for requesting the server device to register the ID, receiving an access ID associated with the ID from the server device, and recording the access ID in a magnetic data recording area provided in the external memory medium; and printing means for printing another unique access code obtained by subjecting the access ID to prescribed conversion processing in a printing area of the external memory medium.

A game system according to the present invention comprises a plurality of game machines and a server device connected to the game machines via a network, and wherein the game system further comprises: memory means for storing a plurality of game programs; and game processing means for reading a specific game program that is selected on the condition of satisfying a prescribed requirement from among the programs stored in the memory means, and executing the game program.

A game system according to the present invention comprises a plurality of game machines and a server device connected to the game machines via a network, and wherein the game system further comprises: data management means for storing a character message entered from a terminal device connectable via a network to perform a data management task on a database; and display means for displaying the character message in response to a prescribed operation of a player on image display means of a game machine operated by the player.

A game system according to the present invention comprises a plurality of game machines capable of reading game information stored in an external memory medium, and a server device connected to the game machines via a network, and wherein the game machines each comprise: an external interface configured such that an external memory medium is detachably attached thereto; means for deciding an ID for identifying an external memory medium attached to the external interface; decision means for deciding identification information for game players which is associated one-to-one with the identification information so that a game player is capable of identifying; printing means for printing the identification information for game players in a predetermined place of the external memory medium; transmission means for transmitting the decided ID and game information to the server device; and recording means for recording part of the game information transmitted to the server device in the external memory medium, and wherein the server device comprises: means for deciding managing identification information for managing the ID transmitted from a game machine; transmitting means for transmitting the managing identification information to a game machine and also transmitting the entire or part of the information stored in the memory means to the game machine in response to a request from the game machine; and game processing means which transmits the entire or part of the information stored in the memory means to the game machine having requested the same to allow the game machine to perform game processing when connectable to the game machine via a network, whereas, when not connectable to the server device via a network, performs game processing using the partial information recorded on the external memory medium.

DETAILED DESCRIPTION

An embodiment of the present invention will now be described with reference to the drawings.

Figure 1:
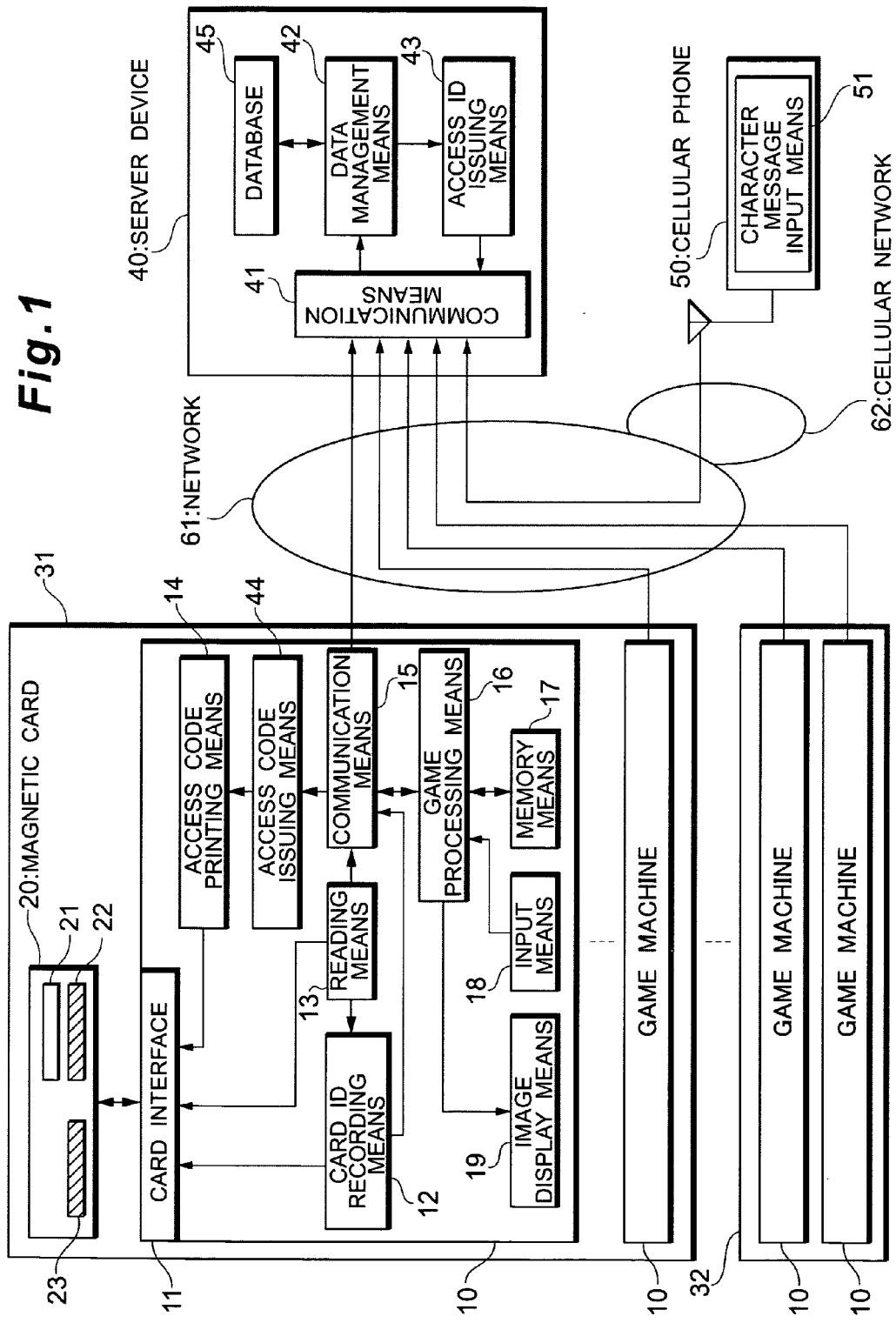
FIG. 1 is a network block diagram illustrating a game machine according to the present invention.

FIG. 1 is a network block diagram illustrating game machines installed at video game arcades. The reference numerals 31 and 32 represent play facilities such as video game arcades located separately in various districts in Japan (e.g. various prefectures, cities, villages, or Tokyo's 23 wards). Each video game arcade has a plurality of game machines 10. These game machines 10 are arcade game machines with large displays, which are connected with one another by a LAN composed of LAN cables, repeaters, routers, switching hubs and so on. The game machines are further connected to an external network 61 via routers. The network 61 is a data communication network constituted by various private lines or public lines, such as an ISDN network, an internet network, or a public telephone line network, and is configured to enable bidirectional data communication between a server device 40 and the game machines 10. Data communication between the game machines 10 and the server device 40 conforms to TCP/IP suitable for open networks.

A player is allowed to play a game on a game machine 10 not only by putting a coin in the machine but also by using a magnetic card 20. The magnetic card 20 is a card for recording the player's game results or the like. Various types of information related to the games which the player has played by operating the game machine 10 are sent to the server device 40 via the network, and recorded on a database 45. At the same time, part of the information required for game processing is recorded on the magnetic card 20 in the game machine 10. This means that information on the play of each player is managed by the server device 40, while part of the information is stored as backup in the data storage area 23 of the magnetic card 20. The data stored as backup in the data storage area 23 shall be herein referred to as "card data". According to the present embodiment, the server device 40 stores, for each player, the following information items in association with each other for the purpose of managing data on the magnetic card 20.

Card ID
Access ID
Access code

As used herein, the term "card ID" refers to identification information for identifying a magnetic card 20. Such identification information is not restricted to any particular information as long as card IDs are assigned to respective magnetic cards 20 so as not to duplicate each other. For example, a card ID may be binary data comprised of a combination of a date and time when the game machine 10 is accessed by using the magnetic card 20 (second/minute/hour/day/month/year) and the serial number (production number) of the game machine 10. More specifically, if the date and time is 16:32:21, May 27, 2002 and the serial number of the game machine 10 is 9900A31B, the card ID will be binary data representing "9900A31B20020527163221". It is usually impossible that two or more players will access the same game machine 10 at the same time to play a game. Therefore, it can be assumed that card IDs can be assigned without duplication by generating them using the date and time of access and the serial number. In lieu of the serial number as mentioned above, an identification number may be assigned to each outlet and further a management number may be assigned to each game machine in each outlet. It is also possible to generate card IDs without duplication by combining these numbers to produce identification data.

When simply referred to herein as "ID", it shall indicate unique information for identifying an external memory medium (including a magnetic card). Like the aforementioned "card ID", such ID also can be generated from the serial number of a game machine 10 and time information.

As used herein, the term "access ID" refers to a sequential serial number starting from zero that is used by the server device 40 to perform data management on the database 45. The serial number is incremented by one every time a new registration is entered. More specifically, if there are n registrants, the access ID is in the range of zero to (n−1). The term "access code" refers to code information obtained uniquely by computing predetermined functions based on the access ID and is comprised of 16 alphanumeric characters. Such access code, consisting of relatively small number of digits, will be easy to input manually and hence can be used conveniently for user authentication. The server device 40 registers the card ID, access ID, and access code on the database 45 together with the player's game data, and implements management of these data.

As shown in FIG. 1, the game machine 10 has a card interface (external interface) 11, card ID recording means 12, reading means 13, printing means 14, communication means 15, game processing means 16, memory means 17, input means 18, image display means 19, and access code issuing means 44. When a player inserts a magnetic card 20 in the card interface 11, the reading means 13 reads the card ID recorded in the magnetic data recording area 22 of the magnetic card 20. Magnetic cards 20 are shipped in the state of having no card ID recorded thereon, and when one of such magnetic cards 20 having no card ID is inserted into the game machine 10, the game processing means 16 issues a card ID. As described above, the current time is required to generate a card ID. The game processing means (control means) of the game machine 10 therefore obtains the current time from server device 40 when activated, and generates a card ID, utilizing time obtained from a built-in timer. The server device 40 obtains the exact date and time, using the NTP protocol, and is configured such that no error occurs. Thus, the game machines 10 located in various places of the country are allowed to operate synchronously with the exact time and therefore it is possible to avoid the duplication of card IDs due to time error. In addition to the aforementioned configuration in which, upon being activated, the game machine obtains the current time from the server device and generates a card ID using the time in the built-in timer of the game machine, the game machine may also be configured so as to access the server device to obtain time information every time a card ID is generated. Further, serial number information may be sent from the game machine to the server device so that the server device receiving this information generates a card ID by combining the serial number with the correct time managed in the server device and sends the card ID to the game machine.

When the same card IDs are generated, however, the game processing means 16 will not issue a card ID thus avoiding the duplication of the card IDs, and a new card ID is generated based on the date and time when the magnetic card 20 is inserted into the game machine 10. The card ID generated in this manner is transmitted to the server device 40 via the communication means 15 together with the card data (information on the players game play) and information indicating "no record of access ID", and data processing is requested to the server. The card ID and the information indicating "no record of access ID" received by the communication means 41 are transferred to the data management means 42. The managing means 42 determines, based on the information indicating "no record of access ID", that the database 45 has no ID matching the card ID or the access ID transmitted from the game machine 10, acknowledges the card ID as a new one, and carries out a new user registration using the card ID. For the registration of a new user, an access ID issuing means 43 issues a new access ID. The access ID generated by the access ID issuing means 43 is transmitted to the game machine 10 via the communication means 41.

Thus, the database 45 stores the card ID, the access ID, and the card data in a table in the state associated with each other, such that the card data can be searched by using the card ID and/or the access ID as a key. The card data stored in the table is rewritten to latest data whenever an update is requested by the game machine 10.

The access ID received by communication means 15 is transmitted to the access code issuing means 44 which generates an access code obtained uniquely from that access ID by means of prescribed function computation (e.g. encryption processing). The access code is code information comprised of 16 alphanumeric characters. Upon generation of an access code, the printing means 14 prints the access code on a printing area 21 of the magnetic card 20. The card ID recording means 12 records the card ID in a card ID recording area 22. When the new user registration is completed through the aforementioned procedures, game processing is implemented by the game processing means 16. The memory means 17 is a memory device constituted by a ROM, RAM or the like. The memory means 17 stores not only game programs but also game information, and also functions as a work area for the game processing means 16. The game machine 10 is provided with input means 18 such as various switches and levers, so that a game can be preceded by prescribed input operations. The game video image is displayed by image display means 19.

The new user registration is conducted according to the aforementioned procedures. When the registered magnetic card 20 is inserted into the card interface 11, the card ID, access ID, and card data read by the reading means 13 are transmitted to the server device 40 together with a card data processing request. The data management means 42 performs a search within the database 45 using the access ID as a key. If a matching access ID is found on the database, game information corresponding to the access ID is transmitted to the game machine via the communication means. If no matching access ID is found, the data management means 42 again performs a search, using the card ID as a key. If a matching card ID is found on the database, game information corresponding to the card ID is transmitted to the game machine via the communication means. If it is determined that there is no matching card ID on the database 45, that card is assumed as a new card, and a new user registration is performed as described above. The card data (game information) searched in this manner is transmitted from the server device 40 to the game machine 10 together with the card ID and access ID. When all the data required for game processing have been communicated between the game machine 10 and the server device 40 according to the procedures described above, the game processing means 16 starts implementing game processing.

When a magnetic-card 20 is inserted into the card interface 11 of a game machine 10, data recorded on the magnetic card 20 is transmitted from the game machine 10 to the server device 40, and the server device 40 implements the following processing steps.

<Step S1>

Does the received data include an "access ID"?

If yes, the process proceeds to Step S2.

If no, the process proceeds to Step S3.

<Step S2>

Has matching data been found in the database 45 as the result of a search using the "access ID" as a key?

If yes, the process proceeds to Step S4-2.

If no, the process proceeds to Step S4-4.

<Step S3>

Has matching data been found in the database 45 as the result of a search using the "card ID" contained in the received data as a key?

If yes, the process proceeds to Step S4-3.

If no, the process proceeds to Step S4-1.

<Step S4-1>

It is determined that the magnetic card 20 is "an unregistered card (new card)". An "access ID" is newly issued and registered in the database 45 together with the received data. The result of the registration in the database 45 (including the newly issued "access ID") is returned to the game machine 10 and processing is completed.

<Step S4-2>

It is determined that the magnetic card 20 is a "registered card (old card)" and the search result obtained by using the "access ID" is updated by the received data. The result recorded on the database 45 is returned to the game machine 10 and processing is completed. In addition to the result recorded on the database 45, various data (for example, the "access ID", "card ID", "latest item holding information obtained by combining the received item holding information and item holding information stored in the server device", and "character customizing setting information") are sent back to the game machine 10 as necessary and at appropriate timing.
<Step S4-3>

It is determined that the magnetic card 20 is a "card having no access ID recorded", and the result of the search conducted using the card ID is updated by the received data. The data recorded on the database 45 is sent back to the game machine 10, and processing is completed. This situation occurs when the game machine 10 has failed to receive the data sent back from the server device 40 due to communication failure immediately after the issuance of the "access ID" or when it has failed to write the "access ID" to the magnetic card 20.
<Step S4-4>

It is determined that the magnetic card 20 is a "card having a wrong access ID" and the process returns to Step S4-1.

The term of validity of a magnetic card 20 is not particularly limited. If any particular expiration date is specified, however, the card ID is required to be updated. A card ID can be updated by the operation of the input means 18 of the game machine 10. According to the present embodiment, a card ID is recorded by the card ID recording means 12. In this case, if communication failure occurs when a card ID is recorded and the recorded card ID is transmitted to the server device 40, the update processing of the card ID will not be completed in the server device 40 even though the card ID on the magnetic card 20 can be updated. Thus, the update of the card ID might fail. To solve this problem, the card ID recording means 12 records the updated card ID in the magnetic data recording area 22 together with the card ID before the update. In this manner, even if the card ID is not updated normally due to communication failure, the processing for updating the card ID can be performed again using the card ID before the update. In addition to this, the failure of updating the card ID due to communication failure can be recovered by issuing a global card ID by the server device 40 and copying the global card ID to the updated magnetic card 20 when updating the card ID. The issuance of a global card ID is performed simultaneously with issuance processing of a new card ID, and the search in the database 45 is performed with the use of the global card ID. Further, since the magnetic card is shipped with no access code printed thereon and no game data is recorded, the card can be updated without being updated by the server, simply by copying the card ID, access ID, access code and game data to the updated card. After updated, the card before the update is set with a flag indicating that the card has been updated to prevent the reuse of the card.

The magnetic card 20 is updated in the manner described below.

The configuration is such that the term of validity (or the number of games played) of a magnetic card 20 is recorded on the magnetic card 20. If a magnetic card, the term of validity (or the number of game plays) of which has expired, is inserted into the card interface 11, a warning is displayed on the image display means 19 of the game machine 10, showing that the term of validity has expired. If the player then gives an instruction to renew the magnetic card by operating a related button, the player will be prompted to insert another magnetic card. If the user follows this prompt and inserts a new magnetic card into the card interface 11, a flag, indicating that the card renewal has been completed, is written onto the old magnetic card to prohibit further use thereof. The old card is then printed with an "EXPIRED" message and discharged from the card interface 11. On the other hand, the "card ID", the "access ID", and the "data to be inherited (data other than those not required to be inherited to the new card, such as a frequency of use)" are copied to the new magnetic card, and the "access code" of the expired magnetic card is printed on the new card.

According to the present embodiment, a player is allowed not only to play a game by using a magnetic card 20 but also to enjoy various services available through the network by registering as a member with the use of the access code printed on the magnetic card 20. This means that the access code can be used as the player's personal authentication means. Member registration can be carried out by accessing the server device 40 from a cellular phone 50 over the Internet, selecting "Member Registration" from the menu, and entering the access code following the input guidance screen. A terminal ID for identifying the cellular phone 50 is registered on the database 45 together with and in association with the card ID, the access ID, the access code, and the card data. The card data can be referred to or rewritten (for example, the appearance of a game character can be modified or the game character can be equipped with an additional item) from the cellular phone 50.

As for network services available through the use of a cellular phone 50, an e-mail distribution service to a cellular phone 50 can be used, for example, to obtain game walkthrough advice or the latest game information. Another service is available by preregistering a character message entered by a player in the server device 40 so that the character message is displayed on a game screen at a predetermined timing, that is to say, on the demonstration screen shown before the player plays a game on the game machine 10 or on the ending screen shown when the game ends. Such character messages are preferably composed of a number of characters that can be entered easily with a cellular phone 50, for example of about 20 characters. Although the input means 18 of the game machine 10 is also usable for entering the character message, it is more desirable to use the input means 51 of a cellular phone 50 or the like than to use the input means 18 for entering the character message, if the purpose is to attract more customers to the video game arcade and to increase sales.

A message to be displayed on a cellular phone 50 may be displayed in correspondence with the game's result after the game has been played in response to a player's input operations. When the game is darts or bowling, for example, several messages may be prestored on the database 45 of the server device 40 in association with number of points gained by a player (for example, the message of "No good!" for the points from zero to 10, "So-so" for the points from 10 to 20, and "Great!" for the points from 21 to 30), so that if a player gains 30 points in the game, the message of "Great!" is transmitted to the cellular phone 50 from the server device 40 through the network 61 and the cellular network 62.

Naturally, the e-mail message transmitted to the cellular phone 50 is not always a message corresponding to the number of points gained by the player himself/herself but may be a message corresponding to the number of points gained by an opponent. More specifically, when a game is played by a player A and a player B, an e-mail message corresponding to the number of points gained by the player B may be sent to the cellular phone 50 of the player A. Such messages corresponding to the numbers of points gained by players may be displayed with different contents for different players, respectively. When such a message is displayed on the cellular phone 50 of the opponent (player B), the player (player A)

may be shown on his/her cellular phone 50 a message to the effect that "such-and-such a message is being shown to the opponent".

As for messages to be transmitted to a cellular phone 50, a message corresponding to a "special game result" may be prestored on the database 45 in addition to or in lieu of the messages corresponding to the number of points gained by a player, so that this message is transmitted to the cellular phone 50. The "special game result" may be one that is obtained when a player has exhibited an excellent technique, for example, when the player has scored a strike in a bowling game or the player has hit the very center of the target in a dart game. If the game result obtained by the input operations of the player is the predetermined "special game result", the server device 40 transmits a "special message" corresponding to this to the cellular phone 50. The "special message" is displayed on the display of the cellular phone 50 receiving this "special message".

Using a cellular phone 50, a player is able to easily enter a character message at any time and any place, without being at a video game arcade, which is also helpful to increase the customer turnover rate of the game arcade. Further, the access code composed of 16 alphanumeric characters is not only easy to enter but also useful for personal identification as each access code is linked to a card ID. A character message entered from a cellular phone 50 is transmitted to the server device 40 via the cellular network 62 and the network 61 by means of packet telecommunication. It should be noted that the means for entering a character message is not limited to a cellular phone, but various other mobile communication terminals such as a PDA, PHS, laptop computer, palmtop computer, and electronic organizer, may be used. Also, a plurality of character messages can be preregistered in the server device 40 whereby a character message well suited to the game scene can be displayed on the screen. For example, at the time when the outcome of a game such as a two-player game is known, one of the game players may perform a prescribed operation (e.g. input with a button or direction key) on a prescribed screen, so that a desired message that is selected from the pre-registered messages by the prescribed operation by the game player is displayed on the game machine 10 of the other game player.

Figure 2:
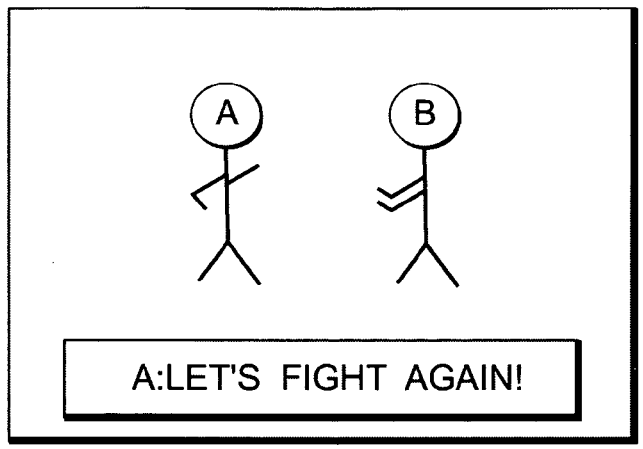
FIG. 2 is a diagram showing that a preset character message is displayed by a prescribed operation on a screen in duplication with the graphic image of a game being played.
Figure 3:
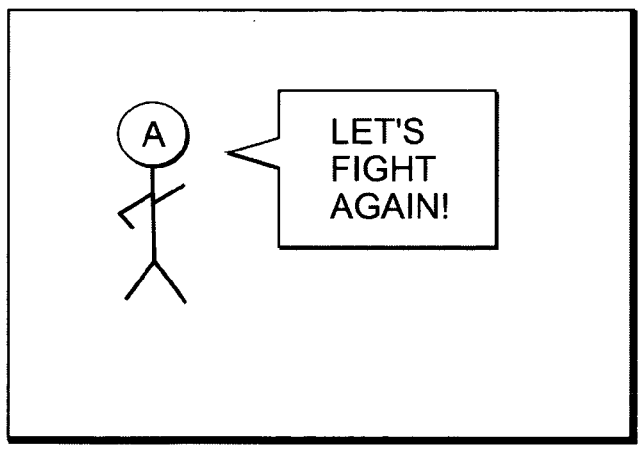
FIG. 3 is also a diagram showing that a preset character message is displayed by a prescribed operation on a screen in duplication with the graphic image of a game being played.
Figure 4:
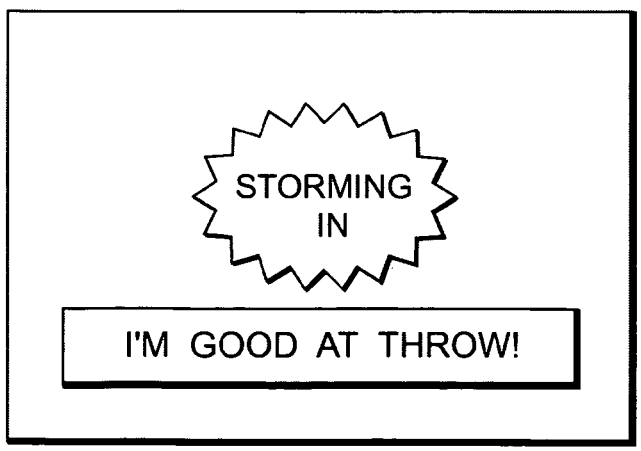
FIG. 4 is also a diagram showing that a preset character message is displayed by a prescribed operation on a screen in duplication with the graphic image of a game being played.

More specifically, as shown in FIG. 2, a preset character message may be displayed in duplication with the graphic image on the screen of a game being played between two players by a prescribed operation. As shown in FIG. 3, the screen of the game being-played may be switched to a screen for displaying a character message by a prescribed operation so that a preset character message is displayed on this screen. Further, as shown FIG. 4, a preset character message may be displayed if a player playing a game performs a prescribed operation when requested by another player to play a game together and the game screen is switched to a screen instructing that there is a request to play a game together.

In the description so far, a case has been shown as an example in which a message is transmitted from the server device 40 to a cellular phone 50. However, the message may be transmitted to a game machine 10. In a game played by a player A and a player B alternately such as bowling or darts, a message corresponding to the number of points gained by the player B may be transmitted to the game machine 10 of the player A. The message content corresponding to the number of gained points may be different for each player. If the message is displayed on the game machine 10 of the opponent player (player B), the player (player A) may be shown a message on his/her game machine 10 to the effect that "such-and-such a message is being shown to the opponent". Further, a "special message" corresponding to a "special game result" may be displayed.

As mentioned above, the game machine 10 and the server device 40 are able to communicate with each other via the network 60. Therefore, the server device 40 is able to obtain various information such as the game result or skill level of a game player, the location of a video game arcade, and the time at which a game is played (hereafter, to be referred to as "play information"). The server device 40 is capable of providing play information to a game player who is a registered member by sending an e-mail to his/her cellular phone 50, or uploading the play information onto a web page of the Internet. The occupancy rates of video game arcades (the number of persons playing or the number of persons able to play) may be computed and displayed on the web page as "crowded", "uncrowded", "average" or the like. It is also possible to display the name and location of a video game arcade where an advanced-level game player is playing a game. Further, it is also possible to publish the names of high achievers on the Internet. Thus, by utilizing the search function of a cellular phone 50 connectable to the Internet, a game player is allowed to find a video game arcade where an exciting game is going on, or a video game arcade where a certain player who he/she wants to play with, or a video game arcade where there are many game players suitable for his/her skill level. Map data may be prepared so that the guidance map can be downloaded if it is not known where the video game arcade is. All these services are useful to give game players an incentive to play games.

In addition to the data described above, the server device 40 further has a card table, a registered user table, an advice table, advice messages, a user data table, a team table, and a BA users table registered therein. The card table is a table for updating game history and various game parameters every time a player plays the game. In this table, card data including the card ID of the magnetic card 20 and the game player's skill level, experience value and number of wins or losses, and other data including play history, storage history and evaluations of the game players, are registered. Herein, the "game history" is recorded by setting a mark flag to a game history to be stored in the server device 40 by pressing a specific button on the game machine upon the end of a game. The "evaluation" is recorded by each player voting according to predetermined evaluation items (such as "highly skilled" or "tricky") to an opponent recorded in the game history, and the opponent player thus evaluated is able to see the result of such votes. The card data is registered in the card table while it is also copied onto the magnetic card 20 via the network 60. The card data may be sent from the game machine 10 to the server device 40 to be registered in the card table, while at the same time the same data may be recorded directly on the magnetic card 20 from the game machine 10. This means that, when a game player has completed playing a game, the latest card data at that time is backed up onto the magnetic card 20. The card data is preselected specifically as the minimum necessary data for playing the game. Therefore, even if a failure occurs in the network to inhibit the game machine 10 from accessing the server device 40, the player is able to continue playing the game by using the card data recorded on the magnetic card 20.

The registered user table is a table for recording the registration status of the registered game players, including user IDs, terminal IDs, card IDs and various other data such as dates of registration and dates of expiration of membership. The management of game player information is implemented in the server by using a user ID that is integrally unified.

Therefore, even if a game player loses a magnetic card 20 and a third person who has obtained this magnetic card 20 tries to play a game by using the magnetic card 20, the third person is prevented from playing the game since his/her identification can not be confirmed by personal authentication that is done by using a cellular phone or the like based on the terminal ID. Also, since the terminal ID and the card ID are linked with each other by the user ID, the lost magnetic card 20 can be nullified and a new magnetic card 20 can be validated.

The advice table is a table for sending e-mails to terminal devices of registered game players to provide them with advice which will be helpful in playing games. Herein, such e-mail sent to give advice is referred to as "advice mail". Data recorded in the advice table are those reflecting each game player's playing patterns. For example, if the game is a fighting game, the recorded data comprise the number of attacks used during a game by the type of attack, the number of failed attacks by type of attack, the number of times damage is incurred by the type of damage and so on. If the game is a soccer game, the recorded data comprise the rate of successful goal attempts, dribbling skill, passing accuracy and so on. The server device 40 analyzes these data statistically to find the strengths and weaknesses of the game player. For example, if it is found that the game player exhibits a low rate of successful goal attempts even though the probability of his/her selecting to make a shot around the goal is high, advice is provided to the game player by an e-mail, that says: "The probability is low that your shot around the goal will be successful. So don't rush and try to pass the ball to your teammate." Further, the server device 40 also may be configured to analyze the playing patterns of the opponent player to find his/her weakness or the like and to send an e-mail to teach the game player how to attack the opponent. For example, if the opponent player exhibits a low probability of succeeding in stealing a ball dribbled near the center of the field, advice may be given to the game player by e-mail, that says: "Your opponent is not good at stealing a ball dribbled near the center of the field. So you should try to dribble through the center." Such advice is prepared in several different patterns as text advice messages 104, and the server device 40 selects a proper message therefrom based on the results of the aforementioned analysis and sends the same to the terminal device of the game player.

The user data table is a table for recording basic information on the registered game players, and such information includes user IDs, nicknames of game characters, birthdays of game players, and winning points. The team table is a table for registering basic information on teams. According to the present embodiment, a team (group or organization) may be formed by a plurality of players so that the players compete with each other within the team to achieve a higher score in a game. Such a team can be formed by anybody, simply by registering a team name and a password in the server device 40. The founder of a team serves as a leader while other game players are allowed to belong to the team by obtaining the "team name" and the "password" from the leader or the like. If there are a plurality of teams, each game player is allowed to belong to only one team. The game score of a team is based on the sum of scores of the game players belonging to the team. The game scores of the teams are calculated by the server device 40 for each of the video game arcades located in various districts on a team basis and the ranking of high achieving teams is published. The fact that the game scores are counted for each of the video game arcades allows the video game arcades using this system to give incentive to game players to participate in the game.

Further, game scores of the respective players in a team are also calculated by the server device 40 and the ranking is displayed. If game players with similar skill levels form a team and compete on game scores with each other, the game players will be allowed to comfortably compete on game scores, which will in turn improve their skills and enhance the incentive to participate in the game. Further, if the game score of each game player is made available to other game players in a team, the game players are given opportunities to communicate with other players in the team, which will also give incentive to participate in the game.

The BA user table is a table for recording data on the management of the course of a mini-game played on a terminal device such as a cellular phone. The mini-game is a simulation game to train game characters. The BA user table records IDs of mini-game characters and so on. Depending on the mini-game result, the game player is allowed to obtain a sound melody or a standby screen image for his or her cellular phone, virtual money used in the game, or an item usable in the video game arcade.

Further, a plurality of game programs which vary from each other in the level of difficulty and the way the game develops may be stored in the memory means 17, the card IDs of the players who have achieved a certain level of results (for example, who have achieved the highest score in the video game arcade) may also be stored in the server device 40, and a special program may be prepared for only these players so that they can play them when they visit the video game arcade again. In this manner, the incentive to play the game can be enhanced and the ability to attract customers will also be enhanced. Conventionally, the contents of software of a game are all the same in every video game arcade. In contrast, as in the present invention, if a plurality of game programs having different contents are prestored in the memory means 17 and, on the other hand, the server device 40 stores which game player has played which game on which game machine in which video game arcade, it is possible to provide game players with gaming environments full of originality. More specifically, according to the present invention, it is possible to prepare a game program which can be played by game players on a specific game machine among a plurality of game machines installed at a specific video game arcade (hereinafter, referred to as "special game"). Therefore, the incentive to play on the specific game machine can be enhanced and thus the ability to attract customers can also be enhanced. Further, the special game may be selected from among a plurality of game programs by access from a cellular phone 50. More specifically, when a game player inserts a magnetic card into the game machine, the magnetic card ID is sent to the server device, the server device upon receiving the ID determines whether or not the game player is a qualified player to play the special game (whether or not the player satisfies the condition for starting the special game). Determining that the player is qualified to play the special game, the server device sends a signal to start the special game to the game machine. Upon receiving the signal, the game machine is enabled to execute the program of the special game stored in the memory area. It is also possible to set the system so that permission to play the special game is given to other players of the team to which the player belongs, or to players randomly selected.

As described so far, according to the present embodiment, a card ID is generated based on the date and time of when access is made to the game machine 10 with the use of a card ID 20, and thus the data management can be simplified. Further, high convenience can be provided by using an access code that is composed of 16 alphanumeric characters linked to the card ID. If the configuration where a card ID is issued by the server device 40 is employed, communication failure might occur during the procedure of registering the card ID, causing double registration of data. According to the present embodiment, however, the card ID is issued by the game machine 10 to avoid such a problem.

Additionally, the incentive to participate in a game can be enhanced and the ability to attract customers can also be enhanced by preparing game programs that can be played by specific players only. Further, players are encouraged to enter character messages in their spare time by using a mobile communication terminal such as a cellular phone as input means to enter the character messages, and thus the occupancy rate of the video game arcade can be increased and the ability to attract customers can be improved.

It should be noted that, although the magnetic card 20 is described as an example of the means for storing the card ID in the description above, the present invention is not limited to this, and other card-type storage media such as IC cards also can be used.

According to the present invention, a card ID is generated based on a date and time when the game machine is accessed with the use of a magnetic card. Therefore, card IDs can be generated easily without duplication and the data management is made easy. Further, according to the present invention, a unique card ID with high redundancy is generated when using a card which has been shipped with no ID (unique ID) recorded thereon, and when registration is made on the server database using that card ID, an access ID with low redundancy is generated and recorded on the card and, at the same time, an access code obtained by converting the access ID is printed on the card. Data management is thereby made easier. The management of the association between the database and the card is also easy when it is updated. Further, the ability to attract customers can be enhanced by preparing game programs that can be played only by specific players. Further, since character messages to be displayed on a game machine can be entered by using a portable terminal, the use efficiency of the game machine at the video game arcade can be improved.

The invention claimed is:

1. A game system comprising:
a server device having a database configured to store identification information for identifying each player and a plurality of optional messages, the plurality of optional messages being in association with the identification information;
an arcade game machine, installed at a play facility, operatively connected to the server device via a network and configured to allow a player to play a game; and
a mobile terminal device operatively connected to the server device via a network and having a user interface,
wherein the mobile terminal device is configured, per operation provided via the user interface by the player, to receive at least a first one of the optional messages consisting of only identification information and to send the at least a first one of the optional messages to the server device before the game starts on the arcade game machine,
wherein the server device is configured to receive the at least a first one of the optional messages from the mobile terminal device and to store the at least a first one of the optional messages in the database before the game starts on the arcade game machine,
wherein the arcade game machine is configured to inform the server device of the event which has occurred during progress, or as a result, of the game played by the player, and wherein the server device is configured to send a second one of the optional messages in accordance with the event informed from the arcade game machine to the arcade game machine such that the second one of the optional messages is displayed on the arcade game machine.

2. The game system according to claim 1, wherein the server device is configured to send the at least a first one of the optional messages in accordance with the event informed from the arcade game machine to the mobile terminal device such that the at least a first one of the optional messages is displayed on the mobile terminal device.

3. The game system according to claim 1,
wherein the optional messages received from the mobile terminal device are in association with scores to be acquired in the game to be played,
wherein the arcade game machine is configured to calculate a score acquired as a result of a game played by the player and to inform the server device of the acquired score, and
wherein the server device is configured to send the at least a first one of the optional messages in accordance with the score informed from the arcade game machine to the arcade game machine such that the at least a first one of the optional messages is displayed on the arcade game machine.

4. The game system according to claim 1, further comprising another arcade game machine operatively connected to the server device via the network and configured to allow an opponent player to play the game,
wherein the server device is configured to send the at least a first one of the optional messages in accordance with the event informed from the arcade game machine to the other arcade game machine such that the at least a first one of the optional messages is displayed on the other arcade game machine.

5. The game system according to claim 1,
wherein the second one of the optional messages is in association with a special result of the game to be played, and
wherein if the special result occurs in the game played by the player, the server device is configured to send the second one of the optional messages to the arcade game machine such that the second one of the optional messages is displayed on the arcade game machine.

6. The game system according to claim 1,
wherein the arcade game machine includes an ID reader configured to read the identification information recorded on a machine-readable medium and to send the read identification information to the server device such that the server device authenticates the read identification information with reference to the database, and
wherein the arcade game machine is configured to allow the player to play the game based on the authentication by the server device.

7. The game system according to claim 6,
wherein the server device is configured to store an access code for each player in association with the identification information,
wherein the mobile terminal device is configured to receive an access code per operation provided through the user interface by the player and to send the access code to the server device,
wherein the server device is configured to authenticate the access code based on the identification information, and
wherein the mobile terminal device is configured to allow the player to input the at least a first one of the optional messages through the user interface based on the authentication by the server device.

8. A game system comprising:
   a server device having a database configured to store identification information for identifying each player and a plurality of optional messages, the plurality of optional messages being in association with the identification information; and
   an arcade game machine, installed at a play facility, operatively connected to the server device via a network and configured to allow a player to play a game; and
   wherein the server device is configured to receive at least a first one of the optional messages from a mobile terminal device, the at least a first one of the optional messages being inputted to the mobile terminal device by the player, and to store the at least a first one of the optional messages in the database before the game starts on the arcade game machine, the at least a first one of the optional messages consisting of only identification information for the player,
   wherein the arcade game machine is configured to inform the server device of the event which has occurred during progress, or as a result, of the game played by the player, and
   wherein the server device is configured to send a second one of the optional messages in accordance with the event informed from the arcade game machine to the arcade game machine such that the second one of the optional messages is displayed on the arcade game machine.

9. The game system according to claim 8, wherein the server device is configured to send the at least a first one of the optional messages in accordance with the event informed from the arcade game machine to the mobile terminal device such that the at least a first one of the optional messages is displayed on the mobile terminal device.

10. The game system according to claim 8,
    wherein the optional messages received from the mobile terminal device are in association with scores to be acquired in the game to be played,
    wherein the arcade game machine is configured to calculate a score acquired as a result of a game played by the player and to inform the server device of the acquired score, and
    wherein the server device is configured to send the at least a first one of the optional messages in accordance with the score informed from the arcade game machine to the arcade game machine such that the at least a first one of the optional messages is displayed on the arcade game machine.

11. The game system according to claim 8, further comprising another arcade game machine operatively connected to the server device via the network and configured to allow an opponent player to play the game,
    wherein the server device is configured to send the at least a first one of the optional messages in accordance with the event informed from the arcade game machine to the other arcade game machine such that the at least a first one of the optional messages is displayed on the other arcade game machine.

12. The game system according to claim 8, wherein the second one of the optional messages is in association with a special result of the game to be played, wherein if the special result occurs in the game played by the player, the server device is configured to send the second one of the optional messages to the arcade game machine such that the second one of the optional messages is displayed on the arcade game machine.

13. A game system comprising:
    a server device having a database configured to store identification information for identifying each player and a plurality of optional messages, the plurality of optional messages being in association with the identification information; and
    a plurality of arcade game machines, installed at a play facility, operatively connected to the server device via a network and configured to allow players to play a game to compete with one another; and
    wherein the server device is configured to receive at least a first one of the optional messages from a mobile terminal device, the at least a first one of the optional messages being inputted to the mobile terminal device by the one player, and to store the at least a first one of the optional messages in the database before the game starts on the arcade game machine, the at least a first one of the optional messages consisting of only the identification information for the one player,
    wherein one of the plurality of arcade game machines is configured to inform the server device of the event which has occurred during progress, or as a result, of the game played by the one player, and
    wherein the server device is configured to send a second one of the optional messages in accordance with the event informed from the one of the plurality of arcade game machines to at least one other arcade game machine on which an opponent player plays the game such that the second one of the optional messages is displayed on the at least one other arcade game machine.

14. The game system according to claim 13, wherein the server device is configured to send the at least a first one of the optional messages in accordance with the event informed from the arcade game machine to another mobile terminal device carried by the opponent player such that the at least a first one of the optional messages is displayed on the another mobile terminal device.

15. The game system according to claim 13, wherein the server device is configured to send a different one of the optional messages from the at least a first one of the optional messages to the one of the plurality of arcade game machines such that the different one of the optional messages is displayed on the one of the plurality of arcade game machines.

16. The game system according to claim 13,
    wherein the optional messages received from the mobile terminal device are in association with scores to be acquired in the game to be played,
    wherein the one of the plurality of arcade game machines is configured to calculate a score acquired as a result of a game played by the one player and to inform the server device of the acquired score, and
    wherein the server device is configured to send the at least a first one of the optional messages in accordance with the score informed from the one of the plurality of arcade game machines to the at least one other arcade game machine such that the at least a first one of the optional messages is displayed on the at least one other arcade game machine.

* * * * *